(12) United States Patent
Quibriac et al.

(10) Patent No.: US 11,719,196 B2
(45) Date of Patent: Aug. 8, 2023

(54) GAS FUEL VEHICLE AND METHOD FOR CONTROLLING A GAS FUEL SUPPLY CIRCUIT

(71) Applicant: VOLVO TRUCK CORPORATION, Gothenburg (SE)

(72) Inventors: Yann Quibriac, Lyons (FR); Raphaël Ribero, Millery (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/814,067

(22) Filed: Jul. 21, 2022

(65) Prior Publication Data
US 2023/0028228 A1    Jan. 26, 2023

(30) Foreign Application Priority Data

Jul. 26, 2021  (EP) .................................... 21187739

(51) Int. Cl.
*F02M 21/02* (2006.01)
*F02D 19/02* (2006.01)

(52) U.S. Cl.
CPC ........ *F02M 21/0239* (2013.01); *F02D 19/023* (2013.01); *F02M 21/0221* (2013.01)

(58) Field of Classification Search
CPC ............ F02M 21/0239; F02M 21/0221; F02D 19/023

USPC .................... 123/525, 529, 198 D; 701/107; 73/114.38

See application file for complete search history.

(56) References Cited

U.S. PATENT DOCUMENTS

| 5,522,428 A | 6/1996 | Duvall |
| 8,855,898 B2 | 10/2014 | Maier et al. |
| 2018/0209590 A1 | 7/2018 | Szoucsek et al. |

FOREIGN PATENT DOCUMENTS

| DE | 102017208537 A1 | 11/2018 |
| DE | 102019108381 A1 | 10/2020 |
| EP | 3357042 A1 | 8/2018 |

OTHER PUBLICATIONS

Extended European Search Report in corresponding European Application No. 21187739.4 dated Dec. 20, 2021 (7 pages).

*Primary Examiner* — Hai H Huynh
(74) *Attorney, Agent, or Firm* — Venable LLP; Jeffri A. Kaminski

(57) ABSTRACT

A gas fuel vehicle includes gas fuel engine, a gas fuel supply circuit comprising at least one tank assembly, the tank assembly including a gas fuel tank and a tank valve, an electronic central unit configured to control operation of the gas fuel vehicle, The tank assembly is provided with specific identification data, and the electronic central unit is configured to process the identification data of the tank assembly and to enable an actuation of the tank valve between closed and open states only if the identification data are recognized.

5 Claims, 3 Drawing Sheets

GAS FUEL VEHICLE AND METHOD FOR CONTROLLING A GAS FUEL SUPPLY CIRCUIT

TECHNICAL FIELD

This disclosure pertains to the field of gas fuel vehicle implementing gas fuel energy.

BACKGROUND ART

For environmental considerations, in the automotive industry, being related to passenger vehicles as well as to commercial vehicles, there is an increasing demand for alternative energy sources to fossil energy sources.

Among known solutions, gas fuel such as dihydrogen, compressed natural gas or liquid natural gas or liquid dihydrogen offers interesting perspectives.

This solution implements a gas fuel engine configured to produce a mechanical driving force from gas fuel, and a gas fuel supply circuit configured to supply the gas fuel engine with gas fuel. This solution is also targeting Hydrogen Fuel Cells vehicles providing electricity to electrical motors.

In view of high risks incurred in case of leakage of fuel gas, the gas fuel supply circuit requires a high level of control and security.

SUMMARY

This disclosure aims at enhancing the level of control and security of the gas fuel supply circuit.

To that end, according to an aspect, it is proposed a gas fuel vehicle comprising:
- a gas fuel engine configured to produce a mechanical driving force from gas fuel,
- a gas fuel supply circuit configured to supply the gas fuel engine with gas fuel, the gas fuel supply circuit comprising at least one tank assembly, the tank assembly including a gas fuel tank configured to be filled with gas fuel, and a tank valve connected to the gas fuel tank, the tank valve presenting a closed state preventing gas fuel from flowing through said tank valve, and an open state enabling gas fuel to flow through said tank valve,
- an electronic central unit configured to control operation of the gas fuel vehicle, the electronic central unit being connected to the gas fuel engine and the gas fuel supply circuit, wherein the tank assembly is provided with specific identification data, and
wherein the electronic central unit is configured to process the identification data of the tank assembly and to enable an actuation of the tank valve between the closed state and the open state only if the identification data are recognized.

These provisions ensure that the tank assembly dedicated to the gas fuel supply circuit is used in the gas fuel vehicle. Using a tank assembly that was intended for use with another gas fuel supply circuit, in particular when the tank assembly has been installed in the wrong gas fuel supply circuit by mistake or after it has been stolen from another gas fuel vehicle.

In an embodiment, the tank valve may include a control unit connected to the electronic central unit and configured to control the actuation of the tank valve between the closed state and the open state, the control unit being configured to store the identification data and to communicate the identification data to the electronic central unit.

The gas fuel tank may have a lateral wall and an opening through which the gas fuel flows, and the gas fuel supply circuit may include at least one supply pipe, the tank valve being directly secured to the opening of the gas fuel tank and connecting the opening to the supply pipe.

The tank valve may be secured in an irreversible manner to the gas fuel tank.

Thanks to these provisions the tank valve can be secured to the gas fuel tank in a reliable manner. Besides, removal of the tank valve from the gas fuel tank would cause irreversible damages rendering the tank assembly totally useless.

In another aspect, it is proposed a method for controlling a gas fuel supply circuit of a gas fuel vehicle, the gas fuel supply circuit being configured to supply a gas fuel engine with gas fuel, the gas fuel engine being configured to produce a mechanical driving force from gas fuel, the gas fuel supply circuit comprising at least one tank assembly, the tank assembly including a gas fuel tank configured to be filled with gas fuel, and a tank valve connected to the gas fuel tank, the tank valve presenting a closed state preventing gas fuel from flowing through said tank valve, and an open state enabling gas fuel to flow through said tank valve, the tank assembly being provided with specific identification data, the method comprising processing the identification data of the tank assembly and enabling an actuation of the tank valve between the closed state and the open state only if the identification data are recognized.

BRIEF DESCRIPTION OF DRAWINGS

Other features, details and advantages will be shown in the following detailed description and on the figures, on which.

DESCRIPTION OF EMBODIMENTS

Figure 1:
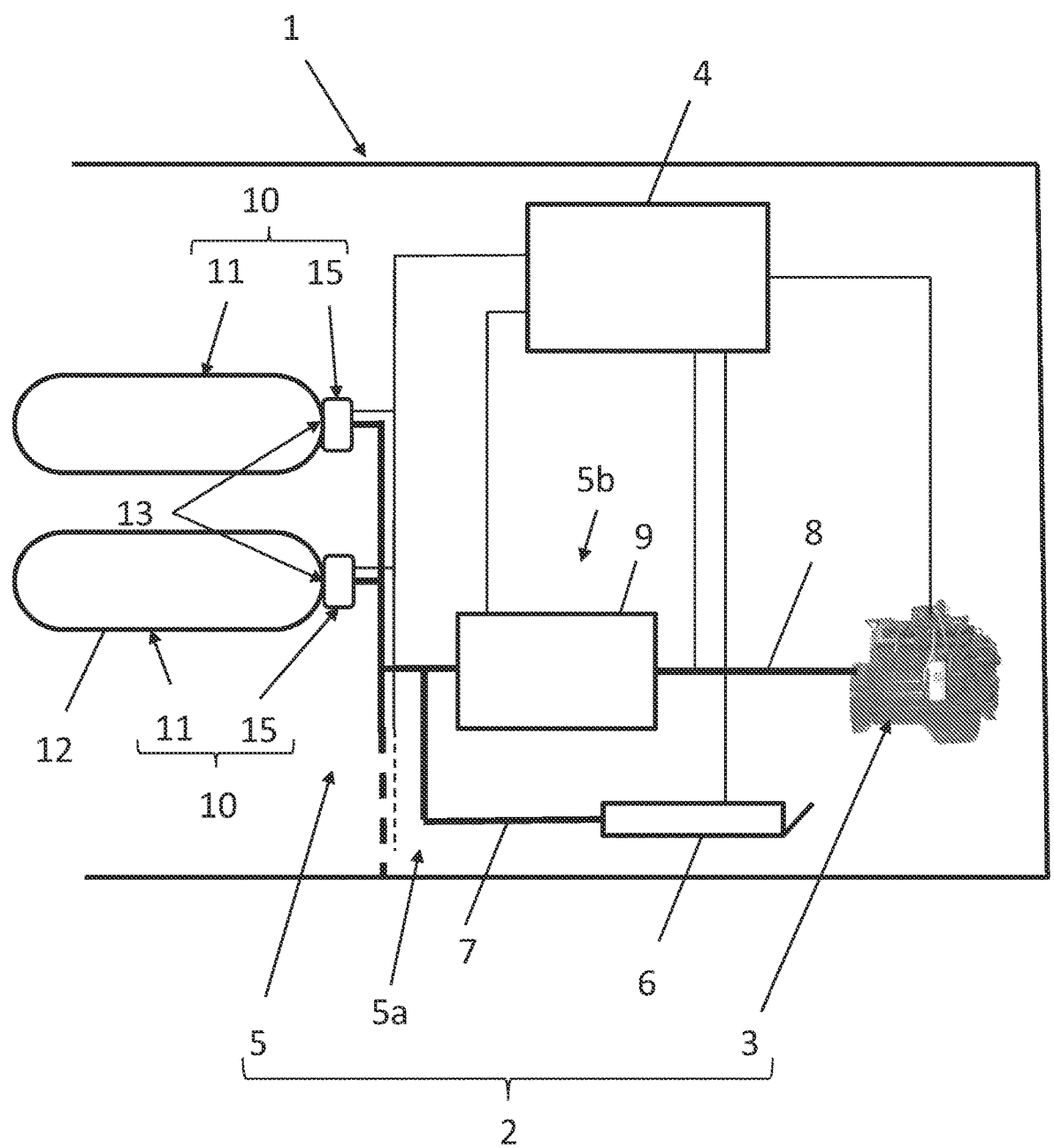
FIG. 1 is a partial representation of a driving assembly of a gas fuel vehicle according to an embodiment, the driving assembly comprising a gas fuel engine and a gas fuel supply circuit configured to supply the gas fuel engine with gas fuel, the gas fuel supply circuit comprising several tank assemblies each including a gas fuel tank configured to be filled with gas fuel, and a tank valve connected to the gas fuel tank.

FIG. 1 schematically represents a portion of a driving assembly 2 of a gas fuel vehicle 1 according to an embodiment.

The driving assembly 2 comprises a gas fuel engine 3 configured to produce a mechanical driving force from gas fuel, such as dihydrogen, compressed natural gas, liquid natural gas or liquid dihydrogen. A transmission chain, not shown, transmits the mechanical driving force to wheels to move the gas fuel vehicle 1.

To supply the gas fuel engine 3 with gas fuel, the driving assembly 2 also comprises a gas fuel supply circuit 5 comprising one or several tank assemblies 10. In FIG. 1, two tank assemblies 10 are represented and include each a gas fuel tank 11 configured to be filled with gas fuel. The gas fuel tank 11 has a lateral wall 12 conformed in any suitable shape, and an opening 13 through which the gas fuel flows either in a filling direction when the gas fuel tank 11 is filled, or in an opposite supplying direction when the gas fuel tank 11 is emptied to supply the gas fuel engine 3 with gas fuel.

Each tank assembly 10 also includes a tank valve 15 connected to the gas fuel tank 11. Preferably, to improve safety of the tank assembly 10, the tank valve 15 is directly secured in an irreversible manner to the opening 13 of the gas fuel tank 11. For example, the tank valve 15 may be sealed to the gas fuel tank 11, especially to a structure of the gas fuel tank 11, such as the lateral wall 12. The tank valve 15 may also be soldered to the structure of the gas fuel tank 11. Alternatively, the tank valve 15 may be secured inside the gas fuel tank 11 itself.

The tank valve 15 presents:

a closed state preventing gas fuel from flowing through it so that no fuel gas may enter in the gas fuel tank 11 or escape from the gas fuel tank 11, and an open state enabling gas fuel to flow through it either in the filling direction to fill the gas fuel tank 11 with gas fuel or in the supplying direction to empty the gas fuel tank 11 and supply the gas fuel engine 3 with gas fuel.

Figure 2:
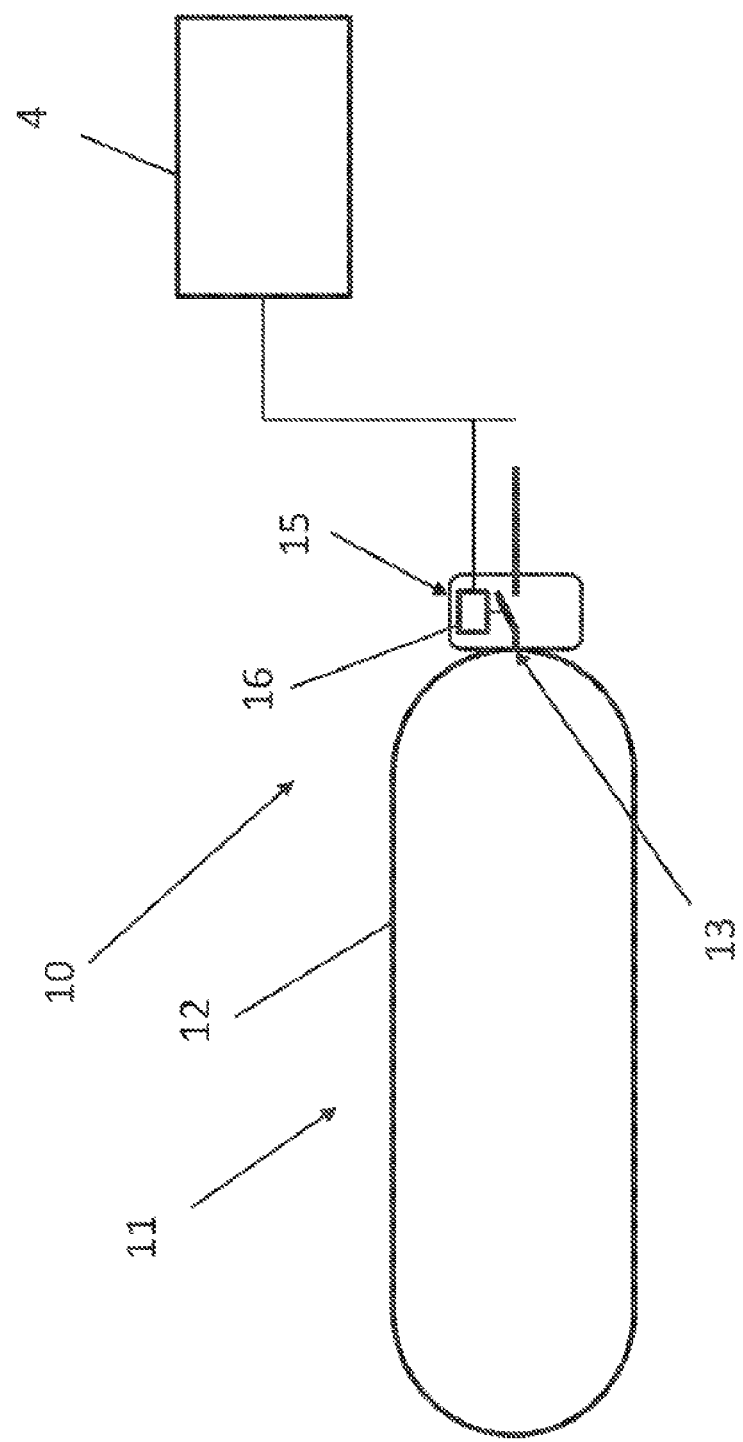
FIG. 2 is a partial representation of the gas fuel supply circuit of FIG. 1, illustrating a control unit of the tank valve connected to an electronic central unit of the gas fuel vehicle, the control unit storing identification data specific to the tank assembly and communicating the identification data to the electronic central unit to enable an actuation of the tank valve between closed and states only if the identification data are recognized.

In the represented embodiment shown in FIG. 2, the tank valve 15 of each tank assembly 10 includes a control unit 16 configured to control an actuation of the tank valve 15 between the closed state and the open state. The control unit 16 is further configured to store identification data that are specific to the tank assembly 10 of the gas fuel vehicle 1 or at least to the gas fuel supply circuit 5 of the gas fuel vehicle 1.

To fill the gas fuel tanks 11 with gas fuel, the gas fuel supply circuit 5 comprises a filling arrangement 5a including a filler 6 configured to be removably connected to a source of gas fuel, such as a station, and one or several filling pipes 7 connecting the filler 6 to the tank valve 15 of each tank assembly 10. Besides, to supply the gas fuel engine 3 with gas fuel, the gas fuel supply circuit 5 comprises a supply arrangement 5b including one or several supply pipes 8 connecting the tank valve 15 of each tank assembly 10 to the supply pipes, possibly through a pressure regulator 9 configured to regulate pressure of gas fuel within gas fuel supply circuit 5.

The gas fuel vehicle 1 an electronic central unit 4 configured to control operation of the gas fuel vehicle 1. The electronic central unit 4 is connected to electronic driving, safety and/or comfort equipments to control and monitor these equipments depending on driving situations, legal and/or driver requirements and others. The electronic central unit 4 also connected to the gas fuel engine 3 and to the gas fuel supply circuit 5 to control and monitor their operation.

The electronic central unit 4 is also connected to the control unit 16 of each tank valve 15. The control unit 16 is configured to communicate the identification data to the electronic central unit 4 and the electronic central unit 4 is configured to process the identification data and to enable the actuation of the tank valve 15 between the closed state and the open state only if the identification data are recognized. For example, the identification data can be a communication bus signal (CAN, Ethernet etc. . . . ) transmitted to the control unit 16. Alternatively, the identification data could be a tank unique serial number combined with a random value recognized by the central unit 16 thanks to an encryption key and an encryption algorithm such as for instance "AES: Advanced Encryption Standard".

Processing of the identification data can be triggered automatically, the control unit 16 of each tank valve 15 communicating periodically the identification data. The processing of the identification data could however be triggered in any other suitable manner. For example, the electronic central unit 4 of the gas fuel vehicle 1 could periodically request the control unit 16 of each valve tank 15 to communicate to identification data. In addition, the invention is not limited to identification data stored in a control unit 16 of the tank valve 16. The identification data could be in the form of a code stuck on the gas fuel tank 11 of the tank assembly 10 or stored in an electronic tag, the electronic central unit 4 controlling a reader periodically reading the code. The processing of the identification data could then also be triggered manually by an operator or a driver of the gas fuel vehicle 1, possibly upon reception of a notification sent by the electronic central unit 4.

Figure 3:
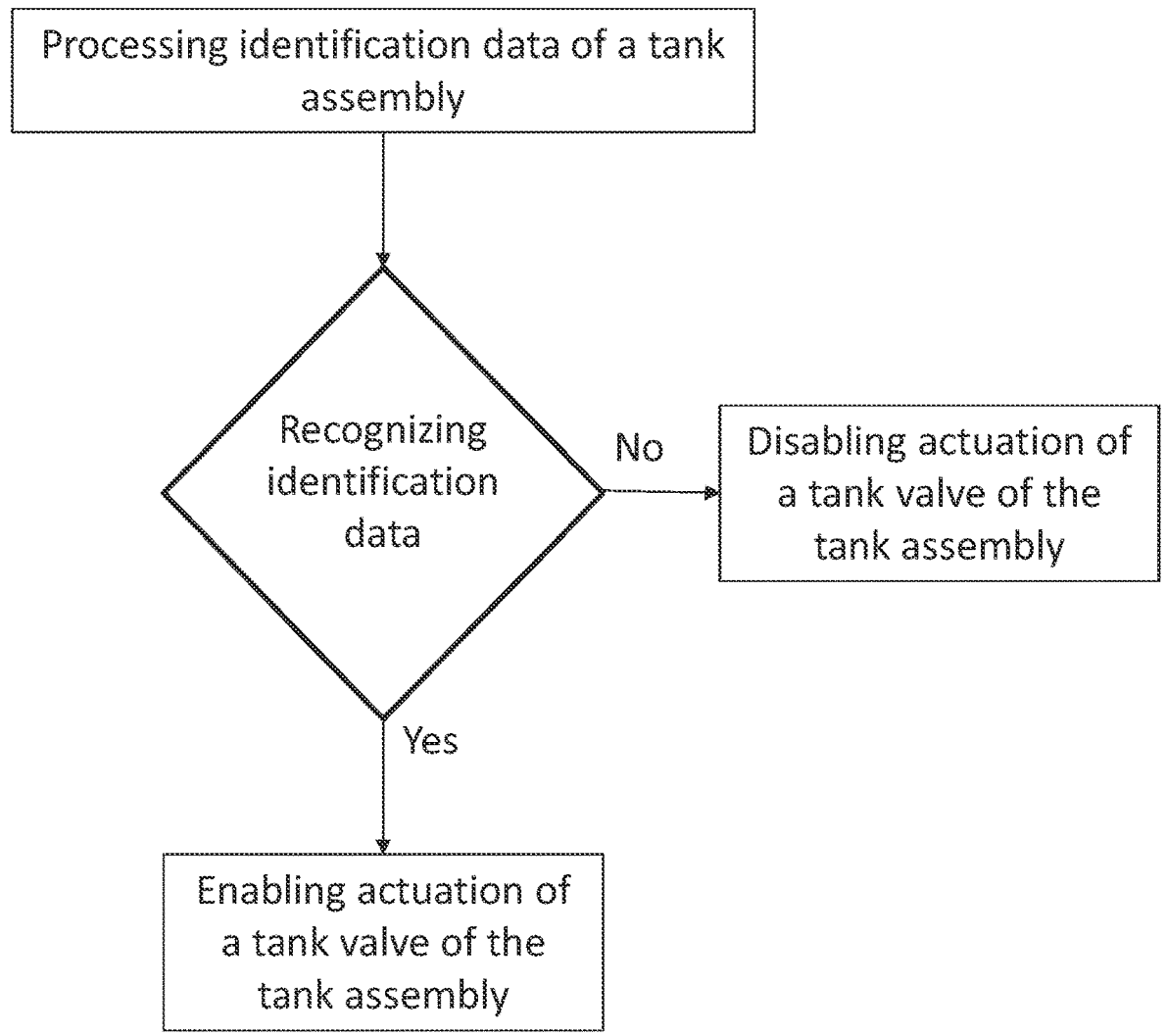
FIG. 3 is a flowchart illustrating steps of a method for controlling the gas fuel supply circuit of FIG. 1.

In relation FIG. 3, a method for controlling the gas fuel supply circuit 5 of the gas fuel vehicle 1 is disclosed.

The identification data of each tank assembly 10 are communicated to the electronic central unit 4 of the gas fuel vehicle 1 either automatically or manually as disclosed previously. The identification data of each tank assembly 10 are processed electronic central unit 4. If the electronic central unit 4 does not recognize the identification data, for example because a wrong tank assembly 10 has been installed by mistake or a stolen tank assembly 10 is intended to be used, then the electronic central unit 4 disables actuation of the tank valve 15 between the closed and open state, thereby rendering the tank assembly 10 inoperative. By contrast, if the electronic central unit 4 recognizes the identification data, then the electronic central unit 4 enables actuation of the tank valve 15 between the closed state and the open state.

The invention claimed is:

1. Gas fuel vehicle comprising:
a gas fuel engine configured to produce a mechanical driving force from gas fuel,
a gas fuel supply circuit configured to supply the gas fuel engine with gas fuel, the gas fuel supply circuit comprising at least one tank assembly, the tank assembly including a gas fuel tank configured to be filled with gas fuel, and a tank valve connected to the gas fuel tank, the tank valve presenting a closed state preventing gas fuel from flowing through said tank valve, and an open state enabling gas fuel to flow through said tank valve,
an electronic central unit configured to control operation of the gas fuel vehicle, the electronic central unit being connected to the gas fuel engine and the gas fuel supply circuit, wherein the tank assembly is provided with specific identification data, and wherein the electronic central unit is configured to process the identification data of the tank assembly and to enable an actuation of the tank valve between the closed state and the open state only if the identification data are recognized.

2. Gas fuel vehicle according to claim 1, wherein the tank valve includes a control unit connected to the electronic central unit and configured to control the actuation of the tank valve between the closed state and the open state, the control unit being configured to store the identification data and to communicate the identification data to the electronic central unit.

3. Gas fuel vehicle according to claim 1, wherein the gas fuel tank has a lateral wall and an opening through which the gas fuel flows, and the gas fuel supply circuit includes at least one supply pipe, the tank valve being directly secured to the opening of the gas fuel tank and connecting the opening to the supply pipe.

4. Gas fuel vehicle according to claim 3, wherein the tank valve is secured in an irreversible manner to the gas fuel tank.

5. Method for controlling a gas fuel supply circuit of a gas fuel vehicle, the gas fuel supply circuit being configured to supply a gas fuel engine with gas fuel, the gas fuel engine being configured to produce a mechanical driving force from gas fuel, the gas fuel supply circuit comprising at least one tank assembly, the tank assembly including a gas fuel tank configured to be filled with gas fuel, and a tank valve connected to the gas fuel tank, the tank valve presenting a closed state preventing gas fuel from flowing through said tank valve, and an open state enabling gas fuel to flow through said tank valve, the tank assembly being provided with specific identification data, the method comprising processing the identification data of the tank assembly and enabling an actuation of the tank valve between the closed state and the open state only if the identification data are recognized.

* * * * *